FLYWHEEL FOR RECORDING AND REPRODUCING INVISIBLE IMAGES ON A MAGNETIC SURFACE

Filed June 1, 1955

United States Patent Office 2,829,207

Patented Apr. 1, 1958

2,829,207

FLYWHEEL FOR RECORDING AND REPRODUCING INVISIBLE IMAGES ON A MAGNETIC SURFACE

André Clément Coutant and Jacques Mathot, Paris, France

Application June 1, 1955, Serial No. 512,544

Claims priority, application France June 4, 1954

4 Claims. (Cl. 179—100.2)

Applicants have already described in a former patent application filed on December 7, 1951, Ser. No. 260,538, a flywheel for recording and reproducing invisible images on a magnetic surface.

This flywheel comprises magnetic heads mounted at spaced angular intervals at the peripheral edge of the flywheel, the spacing of these heads from one another representing the length of one line of the invisible image to be recorded or reproduced.

Now, notably in the reproduction of invisible images it is absolutely necessary that the spacing between adjacent peripheral magnetic heads corresponds exactly to the width of the invisible image, this width being variable, notably when the film on which it has been recorded shrinks; the difference between the pitch or spacing of the magnetic heads and the width of the lines is transferred and added from one line to the next, and very soon it becomes impossible to reproduce the image.

To avoid this drawback means must be provided whereby the spacing between the magnetic heads mounted at the peripheral edge of a flywheel may be adjusted with the upmost accuracy.

To this end and according to the present invention the peripheral surface of the flywheel in which the magnetic heads are mounted is very slightly tapered and the magnetic heads themselves bear on a surface of similar conicity, means being provided for causing these heads to slide simultaneously along this taper; in fact, it will be readily understood that this displacement of the magnetic heads along a tapered surface will alter the spacing thereof, so that the latter will be increased or reduced according to the direction in which this displacement is effected.

Moreover, according to another feature of this invention the peripheral surface of the flywheel is very accurately machined and during the operations of recording or reproducing the invisible images the film is applied against this accurately machined surface which may even be highly-finished or glazed.

The attached drawing illustrates very diagrammatically one form of embodiment of the present invention, given by way of example only.

Figures 1, 2:
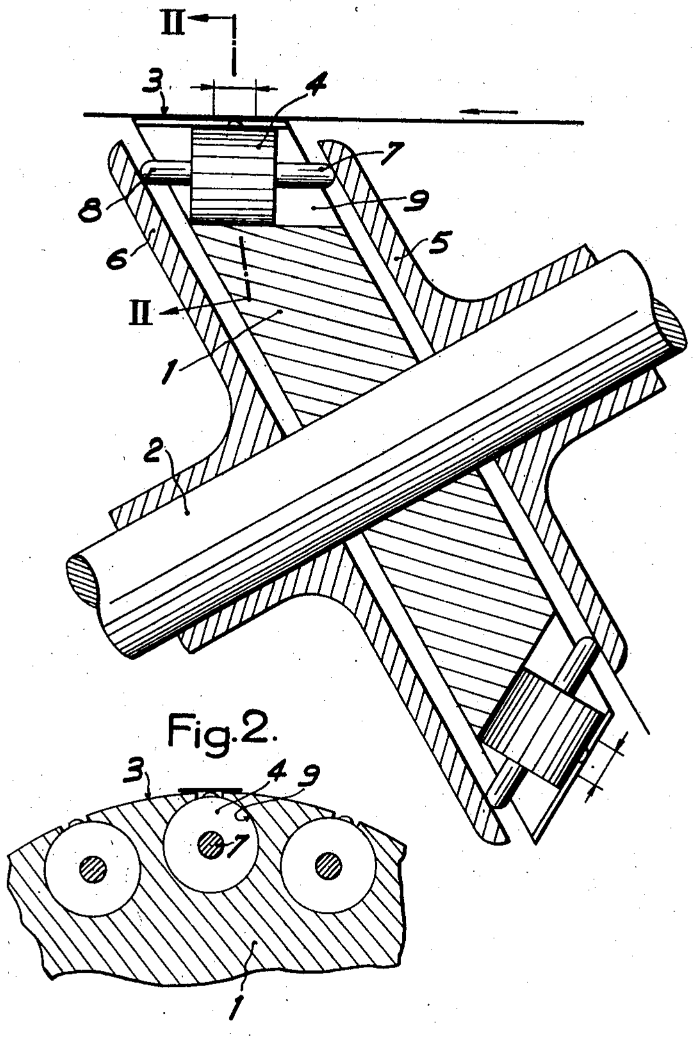
Figure 1 is a longitudinal section of the flywheel.
Figure 2 is a detail shown in cross-section taken upon the line II—II of Fig. 1.

The flywheel proper 1 is suitably wedged or keyed on the rotatably driven shaft 2 and the peripheral outer surface 3 of the flywheel is conical; in this peripheral edge a plurality of spaced cylindrical notches 9 having their axes parallel to the adjacent flywheel outer surface are formed, each notch 9 having a magnetic head 4 mounted therein; a pair of flanges 5, 6 are located on either side of the flywheel 1 and provided with hubs centered on the rotary shaft 2, as shown; each magnetic head 4 comprises a pair of axial pins 7, 8 each engaging with their rounded tips the relevant flanges 5, 6, as shown; from this arrangement it is apparent that if the pair of flanges 5, 6 are bodily displaced along the shaft 2 the magnetic head assembly 4 will be moved in unison therewith but their pitch or spacing will be altered accordingly; any suitable and known device may be employed for bringing about this displacement, such as screw means (not shown), provided that their pitch be suitably selected as well as the taper of the peripheral surface of the flywheel, so that an extremely high degree of precision may be obtained with this adjustment device.

Of course, the form of embodiment described hereinabove with reference to the attached drawing is merely illustrative of the manner in which the invention may be carried out in the practice and should not be construed as limiting the scope of the invention, as many modifications may be brought thereto without departing from the principle of the invention; thus, the flange members 5, 6 may be stationary and rigid with each other, and the displacement of the magnetic head assembly may be obtained by displacing the flywheel 1 relative to the pair of flanges 5, 6.

What we claim is:

1. A flywheel for recording and reproducing invisible images on a magnetic surface, comprising an external tapered surface, means for so securing magnetic heads on said external tapered surface that their gaps are directed radially to the outside and that all these gaps are spaced from one another by the width of one line of the invisible image, and means for causing the whole of said heads to simultaneously slide to the same longitudinal extent on said external tapered surface and therefore similarly alter the spacing between any two adjacent heads.

2. A flywheel for recording and reproducing invisible images on a magnetic surface, which consists of a body having the shape of a frustum of a cone of revolution mounted on a rotary shaft having its axis coincident with the axis of said frusto-conical body, longitudinal cylindrical inner cavities formed in said body at spaced intervals close and practically tangent to the lateral surface of said body, and longitudinal grooves formed in the lateral surface of the flywheel to connect each of said cavities with the outside, a cylindrical magnetic head so arranged in each of said cavities that its magnetic gap is flush with the lateral surface of said frusto-conical body, the width measured between any two adjacent magnetic-head gaps being equal to that of a magnetic-image recording line, and means for causing all the magnetic heads to simultaneously slide through the same distance in their relevant cylindrical cavities so as to cause the distance between the gaps of any two adjacent magnetic heads to vary to the same extent.

3. A flywheel according to claim 1, wherein said magnetic heads carry axial spindles projecting from either ends of said cylindrical cavities in which said magnetic heads are slidably mounted, a pair of discs being slidably mounted on said rotary shaft of said frusto-conical body on either side of said body so that each disc engages one of the outer projecting ends of said spindles, and means for causing said discs, spindles and magnetic heads to slide axially with respect to said frusto-conical body.

4. A flywheel according to claim 2, wherein said tapered lateral surface is accurately machined with the magnetic heads mounted thereon as a finishing step, so that the assembly of these heads is machined exactly according to the generatrix of the frusto-conical body of revolution of the flywheel proper.

References Cited in the file of this patent

UNITED STATES PATENTS

| | | |
|---|---|---|
| 2,245,286 | Marzocchi | June 10, 1941 |
| 2,648,589 | Hickman | Aug. 11, 1953 |